United States Patent

Sakaguchi et al.

Patent Number: 5,846,368
Date of Patent: Dec. 8, 1998

[54] LAMINATE PRODUCING PROCESS

[75] Inventors: Yoshio Sakaguchi; Toshiyuki Kurihara; Akira Kaburagi, all of Wako; Hideho Kubo; Mituaki Sunada, both of Chiba, all of Japan

[73] Assignees: Honda Giken Kogyo Kabushiki Kaisha, Tokyo; K-Plasheet Coporation, Chiba, both of Japan

[21] Appl. No.: 716,708

[22] Filed: Sep. 10, 1996

[30] Foreign Application Priority Data

Sep. 12, 1995 [JP] Japan .................................. 7-233925

[51] Int. Cl.⁶ .................................................. B29C 65/70
[52] U.S. Cl. ........................ 156/245; 156/62.6; 156/83; 156/198
[58] Field of Search ............................ 156/212, 77, 245, 156/62.2, 62.6, 83, 198; 264/51, 53, 45.3, 45.5, 46.4, 257

[56] References Cited

U.S. PATENT DOCUMENTS

| | | | |
|---|---|---|---|
| 3,790,421 | 2/1974 | Habgood, Jr. ........................ | 156/77 X |
| 4,000,097 | 12/1976 | Chant et al. ........................ | 156/77 X |
| 4,138,283 | 2/1979 | Hanusa ................................ | 156/77 |
| 4,504,347 | 3/1985 | Mink et al. .......................... | 156/245 |
| 4,648,921 | 3/1987 | Nutter, Jr. ........................... | 156/77 |
| 5,164,254 | 11/1992 | Todd et al. .......................... | 428/290 |
| 5,258,089 | 11/1993 | Tanaka et al. ....................... | 156/324.4 |
| 5,452,940 | 9/1995 | Maier .................................. | 297/452.32 |
| 5,489,351 | 2/1996 | Yoshida et al. ..................... | 156/62.6 |
| 5,741,380 | 4/1998 | Hoyle et al. ........................ | 156/62.6 |

*Primary Examiner*—Francis J. Lorin
*Attorney, Agent, or Firm*—Armstrong, Westerman, Hattori, McLeland & Naughton

[57] ABSTRACT

A composite core is selected which is formed of a reinforcing fiber and a thermoplastic synthetic resin by a compression molding, and including a first region in which the grammage $M_1$ is set in a range of 400 g/m$_2 \leq M_1 \leq 700$ g/m$^2$ to provide a reduction in weight, and a second region in which the grammage $M_2$ is adjusted in a range of 900 g/m$^2 \leq M_1 \leq 1,200$ g/m$^2$ to provide an enhanced rigidity. At a first step, the composite core is heated, whereby it is expanded, and the thermoplastic synthetic resin is expanded. At a second step, a skin material is superposed onto the composite core. At a third step, the composite core is compressed, and the skin material is bonded to the composite core. In the laminate produced in the above manner, the first region contributes to a reduction in weight, and the second region contributes to an increase in rigidity. Further, because of a larger amount of second region expanded, the reinforcing fibers are stuck into the skin material. This contributes to an increase in bond strength. Thus, it is possible to produce a laminate which has a high bond strength of a surface skin material layer and a rigidity and moreover, is light in weight.

8 Claims, 6 Drawing Sheets

LAMINATE PRODUCING PROCESS

BACKGROUND OF THE INVENTION

1. Field of the Invention

The present invention relates to a process for producing a laminate and particularly, a laminate including a core and a skin material bonded to the core.

2. Description of the Related Art

There is a conventionally known composite core formed from a reinforcing fiber and a thermoplastic synthetic resin (see Japanese Patent Publication No. 2-48423).

For example, when a roof panel for a vehicle is produced by bonding a skin material to a composite core of the above-described type, if the skin material is bonded by plasticizing (i.e., softening and melting) the thermoplastic synthetic resin under heating of the composite core, an adhesive need not be used. This is effective for reducing the production cost.

In this case, to increase the bond strength of the skin material, it is necessary to maintain the plasticized state of the thermoplastic synthetic resin for a relatively long period of time. For this purpose, a METSUKE amount or grammage of the composite core must be increased to increase the heat capacity of the composite core. ("METSUKE" is a unit corresponding to "grammage" for describing a mass of fabric or the like, and represents grams per 1 $m^2$). The increase in grammage is also effective for enhancing the rigidity of the roof panel.

If such a means is employed, however, the following problem is encountered: the weight of the roof panel is increased and hence, it is impossible to meet the requirement for a reduction in weight of the existing vehicle part.

To reduce the weight of the roof panel, the METSUKE amount of the composite core may be decreased in contrast with the above-described case. However, this causes a reduction in bond strength of the skin material and a reduction in rigidity of the roof panel.

SUMMARY OF THE INVENTION

Accordingly, it is an object of the present invention to provide a laminate producing process of the above-described type, wherein the rigidity and the bond strength of the skin material can be increased to the extent attendant with no impedance in practical service and at the same time, a reduction in weight can be achieved.

To achieve the above object, according to the present invention, there is provided a process for producing a laminate, comprised of a core and a skin material bonded to the core, wherein as the core, a composite core is employed which is formed from a reinforcing fiber and a thermoplastic synthetic resin by a compression molding and which includes a first region in which the contents of the reinforcing fiber and the thermoplastic synthetic resin are adjusted to reduce a weight thereof, and a second region in which the contents of the reinforcing fiber and the thermoplastic synthetic resin are adjusted to enhance a rigidity thereof, and wherein the process comprises the steps of: heating the composite core to expand the composite core and to plasticize the thermoplastic synthetic resin; superposing the skin material onto the composite core; and compressing the composite core and bonding the skin material to the composite core.

If the above procedure is employed, the content of the reinforcing fiber and the thermoplastic synthetic resin in the second region of the composite core is larger than that in the first region. The amount of first and second regions expanded under heating depends mainly on the content of the reinforcing fiber and hence, the amount of second region expanded is larger than the amount of first region expanded.

As a result, at the composite core compressing step, the pressing force is preferentially applied to the second region and hence, a large number of reinforcing fibers caused to stand by the expansion is stuck into the skin material. In addition, the heat capacity of the second region is increased because of the larger content thereof and therefore, the plasticized state of the second region is sufficiently maintained at the compressing step.

The skin material is firmly bonded to the second region by an anchoring effect caused by the sticking-in of the reinforcing fibers and a plasticized-state maintaining effect. The second region has a high rigidity after being cured.

By providing the second region in the composite core in the above manner, the rigidity of the laminate and the bond strength of the skin material can be enhanced to the extent attendant with no impedance in practical service.

Additionally, it is possible to provide reductions in weight and producing cost of the laminate by providing the first region, thereby enabling mass production of the laminate.

The grammage $M_1$ in the first region is suitably in a range of 400 g/$m^2$ ≦ $M_1$ ≦ 700 g/$m^2$, and the grammage $M_2$ in the second region is suitably in a range of 900 g/$m^2$ ≦ $M_2$ ≦ 1,200 g/$m^2$. If the grammage $M_1$ in the first region is smaller than 400 g/$m^2$, the rigidity is extremely decreased. On the other hand, if the grammage $M_1$ in the first region is larger than 700 g/$m^2$, the weight is increased. If the grammage $M_2$ in the second region is smaller than 900 g/$m^2$, the rigidity and the bond strength of the skin material are decreased. On the other hand, even if the grammage $M_2$ in the second region is set larger than 1,200 g/$m^2$, the effect is little varied, but an increased production cost is caused.

The above and other objects, features and advantages of the invention will become apparent from the following description of a preferred embodiment taken in conjunction with the accompanying drawings.

DETAILED DESCRIPTION OF THE PREFERRED EMBODIMENT

The present invention will now be described by way of an embodiment with reference to the accompanying drawings.

Figure 1:
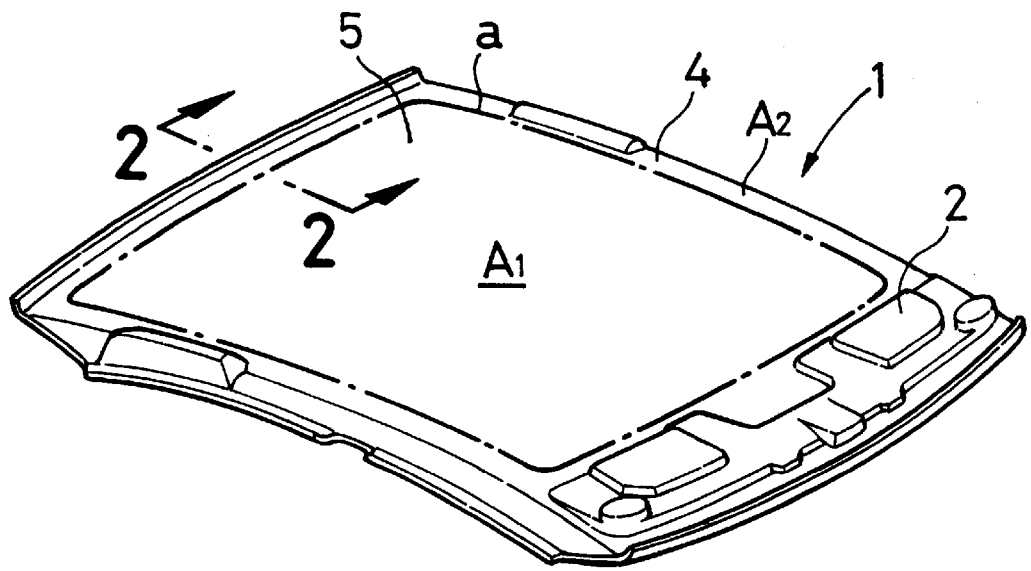
FIG. 1 is a perspective view illustrating one example of a roof panel.
Figure 2:
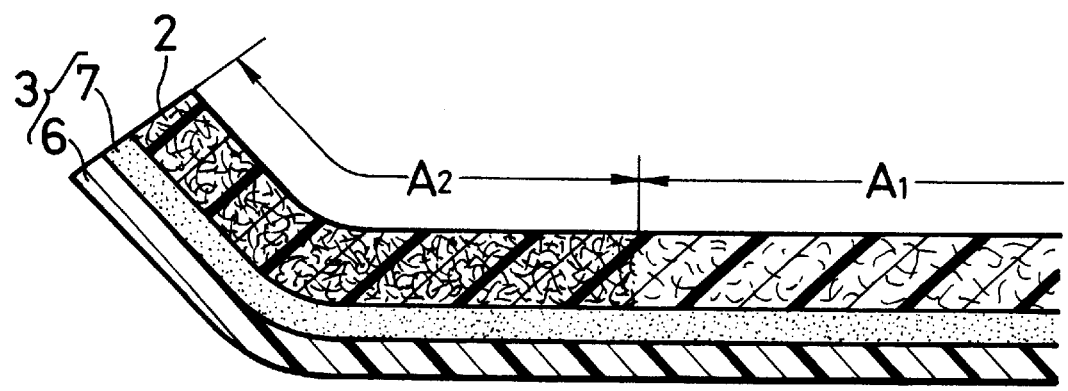
FIG. 2 is a sectional view taken along the line 2—2 in FIG. 1.

Referring to FIGS. 1 and 2, a roof panel 1 for a vehicle in the form of a laminate is formed of a composite core 2, and a skin material 3 bonded to the composite core 2.

The composite core 2 is formed from a reinforcing fiber and a thermoplastic synthetic resin, and has a first region $A_1$ in which the reinforcing fiber and the thermoplastic synthetic resin are contained in small amounts, and a second region $A_2$ in which the reinforcing fiber and the thermoplastic synthetic resin are contained in large amounts.

The first region $A_1$ is disposed in a main portion 5 of the roof panel surrounded by a one-dot dashed line a in FIG. 1 and excluding an outer peripheral portion 4 of the roof panel, and the second region $A_2$ is disposed in the outer peripheral portion 4 outside the one-dot dashed line in FIG. 1.

The skin material 3 is formed of a surface skin material layer 6 made of a thermoplastic synthetic resin, and a cushion layer 7 made of a thermoplastic synthetic resin foam and bonded to the surface skin material layer 6. The cushion layer 7 is bonded to the composite core 2.

In producing the roof panel 1, the following steps are carried out in sequence.

Figure 3:
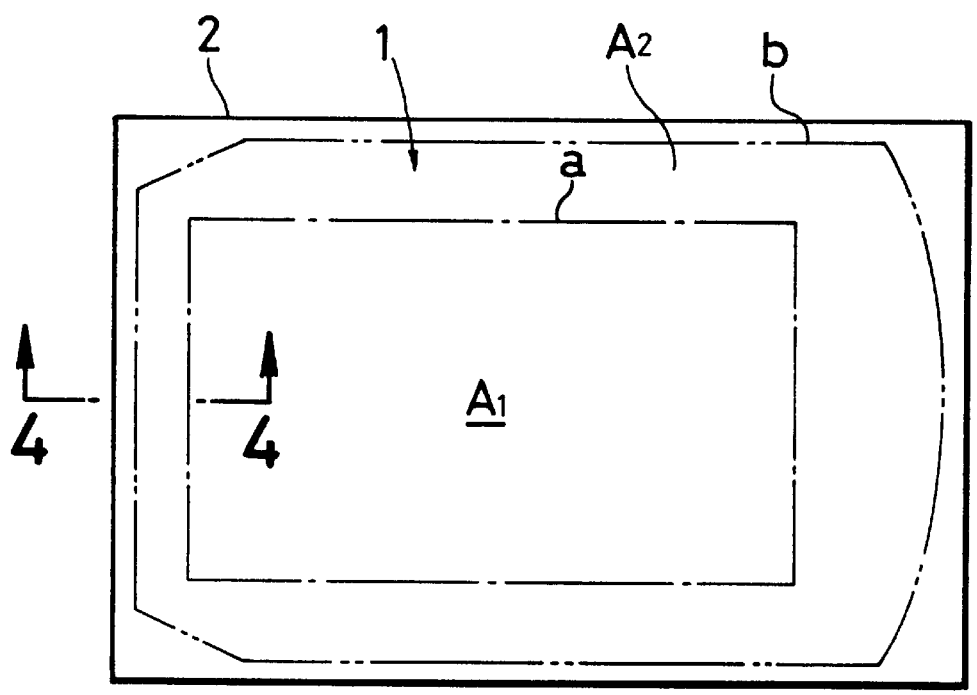
FIG. 3 is a plan view of a composite core.
Figure 4:
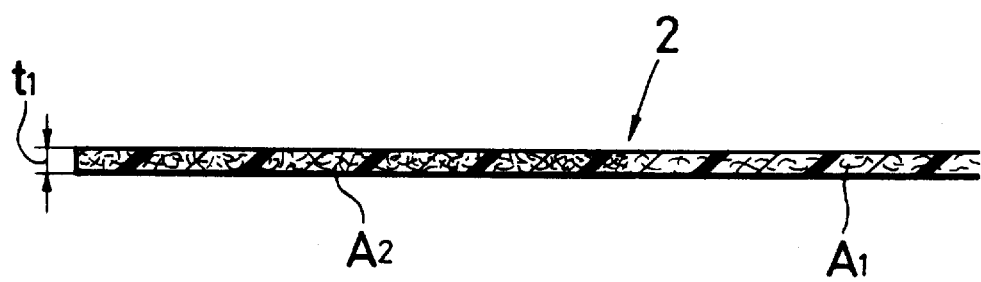
FIG. 4 is a sectional view taken along the line 4—4 in FIG. 3.

Step (a): as shown in FIGS. 3 and 4, a composite core 2 formed of a reinforcing fiber and a thermoplastic synthetic resin is employed. The composite core 2 includes a first region $A_1$ in which the content of the reinforcing fiber and the thermoplastic synthetic resin is adjusted, for example, the grammage $M_1$ is set in a range of 400 g/m² $\leq M_1 \leq$ 700 g/m², in order to reduce the weight, and a second region $A_2$ in which the content of the reinforcing fiber and the thermoplastic synthetic resin is adjusted, for example, the grammage $M_2$ is set in a range of 900 g/m² $\leq M_2 \leq$ 1,200 g/m², in order to enhance the rigidity. The composite core 2 is provided by a compression molding, and has a thickness $t_1$ which is uniform entirely. In FIG. 3, a portion surrounded by a two-dot dashed line b corresponds to a roof panel 1. A portion between the one-dot dashed line a located inside the two-dot dashed line b and an outer peripheral edge is the second region $A_2$, and a portion surrounded by the one-dot dashed line a is the first region $A_1$.

Figure 5:
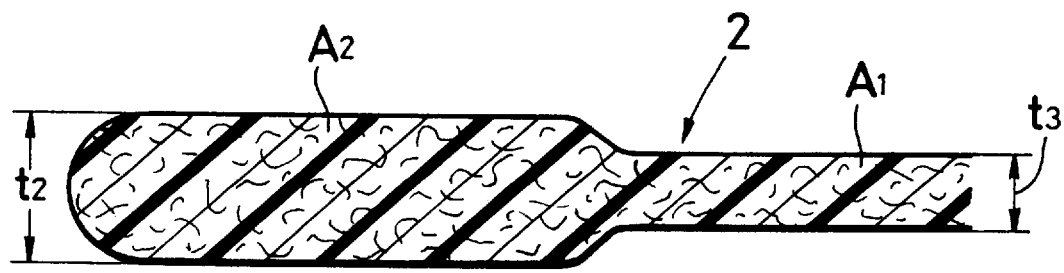
FIG. 5 is a sectional view of an essential portion similar to FIG. 4, but illustrating the composite core in an expanded state.

Step (b): the composite core 2 is heated by a far infrared radiation heater. This heating causes the composite core 2 to be expanded to an increased thickness. As shown in FIG. 5, the thickness $t_2$ of the second region $A_2$ caused by the expansion is large, as compared with the thickness $t_3$ of the first region $A_1$ caused by the expansion, i.e., $t_2 > t_3 > t_1$ (which is a thickness before the expansion). The heating also causes the thermoplastic synthetic resin to be plasticized.

Figure 6:
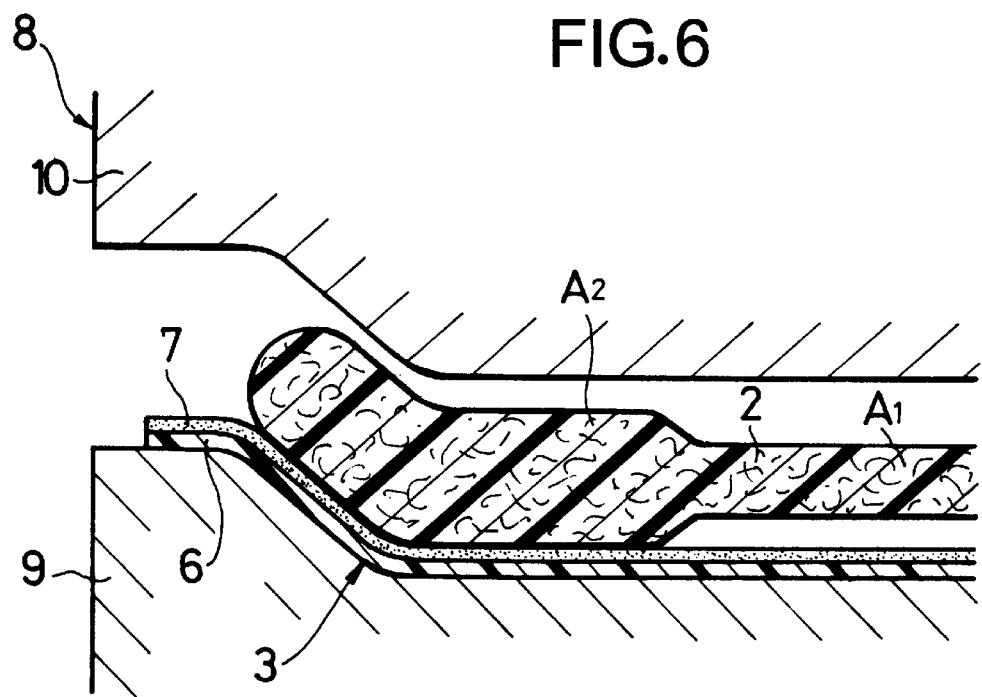
FIG. 6 is a sectional view of an essential portion, illustrating the composite core and the skin material placed in a metal mold.

Step (c): as shown in FIG. 6, a skin material 3 is placed, with its cushion layer 7 turned upwards, onto a lower die 9 in a compression metal mold 8 in an ambient-temperature state and then, the heated composite core 2 is superposed on the skin material 3.

Figure 7:
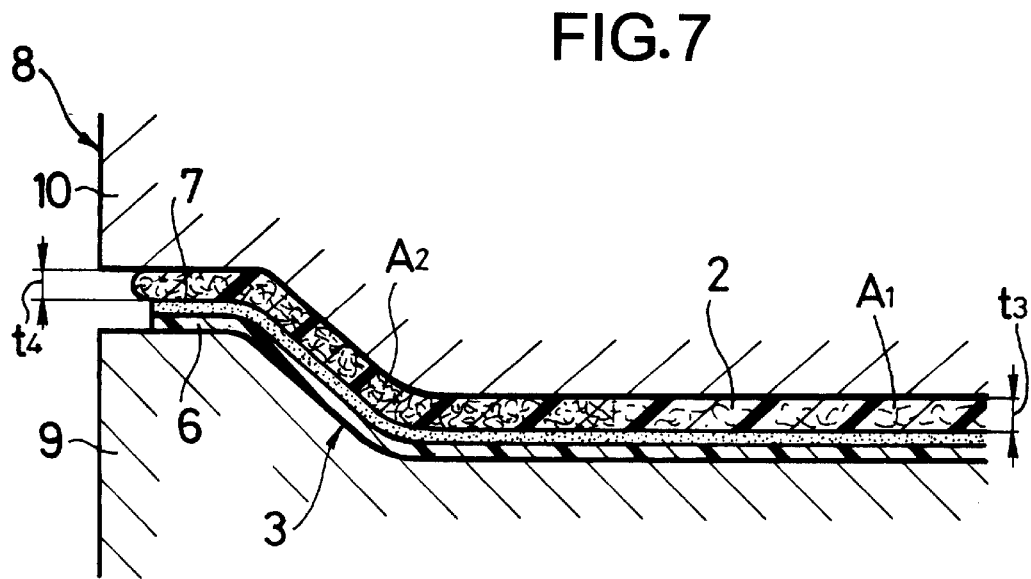
FIG. 7 is a sectional view similar to FIG. 6, but illustrating a compression molding-completed state.

Step (d): as shown in FIG. 7, an upper die 10 is lowered to compress the composite core 2, thereby performing the molding formation of a roof panel 1 by cooperation of the upper and lower dies 10 and 9 with each other. At the same time, the skin material 3 is bonded to the composite core 2 under a pressure.

In this case, the compression thickness $t_4$ in the second region $A_2$ is set, for example, at a value corresponding to the thickness $t_3$ of the first region $A_1$ and hence, the thickness $t_4$ of the composite core 2 is larger than the thickness $t_1$ before the expansion.

If the above-described means is employed, the pressing force is preferentially applied to the second region $A_2$ at the step of compressing the composite core 2 and hence, a large number of reinforcing fibers which has been caused to stand by the expansion is stuck into the cushion layer 7 of the skin material 3. In addition, because the grammage $M_2$ is larger, the heat capacity of the second region $A_2$ is increased and hence, the plasticized state of the second region $A_2$ is sufficiently maintained at the compressing step.

The skin material 3 is firmly bonded to the second region $A_2$ by an anchoring effect caused by the sticking of the reinforcing fibers and a plasticized-state maintaining effect. The second region $A_2$ has a high rigidity after being cured.

By providing the second region $A_2$ in the composite core 2 in the above manner, the rigidity of the roof panel 1 and the bond strength of the skin material 3 can be enhanced to the extent attendant with no impedance in practical service.

Additionally, it is possible to provide reductions in weight and production cost of the roof panel 1 by the provision of the first region $A_1$.

In the roof panel 1, if the rigidity of its outer peripheral portion 4 is increased, the folding of the roof panel 1 can be reliably prevented, for example, during mounting of the roof panel 1. In addition, in a conventionally known roof panel, the skin material thereof is liable to be peeled off from the roof panel outer peripheral portion 4. But this disadvantage is avoided in the above-described roof panel 1, because of the high bond strength of the skin material 3 in the outer peripheral portion 4.

In order to further increase the bond strength between the composite core 2 and the skin material 3, it is preferred to use a skin material 3 with at least a bonded surface side thereof, e.g., the cushion layer 7 thereof in this embodiment, being formed from a thermoplastic synthetic resin that can be plasticized by the composite core which is under heating. Alternatively, the skin material 3 may be formed from only the thermoplastic synthetic resin.

A skin material 3 having a fluffy or fuzzy bonded surface, e.g., a non-woven fabric can be used. If the non-woven fabric is used, fibers forming the non-woven fabric are allowed to enter the plasticized thermoplastic synthetic resin in the composite core 2. This enables the bond strength between the composite core 2 and the skin material 3 to be increased in cooperation with the anchoring effect caused by the sticking-in of the reinforcing fibers.

Figure 8:
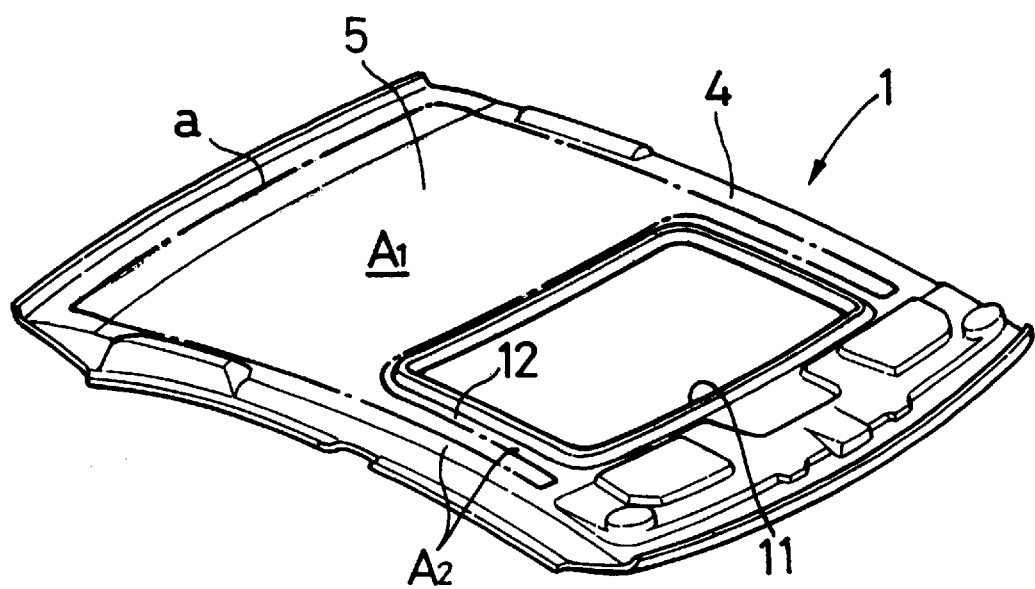
FIG. 8 is a perspective view illustrating another example of a roof panel.

FIG. 8 shows a roof panel 1 for a vehicle in the form of a laminate and having a sun roof opening 11. In this roof panel 1, a first region $A_1$ is disposed in a main portion of the roof panel surrounded by a one-dot dashed line a in FIG. 8 and excluding a peripheral edge portion 12 around the sun roof opening 11 and a roof panel outer peripheral portion 4, and a second region $A_2$ is disposed in the peripheral edge portion 12 around the sun roof opening 11 and in the roof panel outer peripheral portion 4 outside the one-dot dashed line a.

A composite core 2 of the roof panel 1 shown in FIG. 4 corresponds to a known KP Sheet (a trade name; made by K-Plasheet Corporation). The composite core 2 of the roof panel 1 is made by a process described below.

(i) A chopped fiber as a reinforcing fiber and a powdered resin as a thermoplastic synthetic resin are dispersed and mixed in water.

Figure 9:
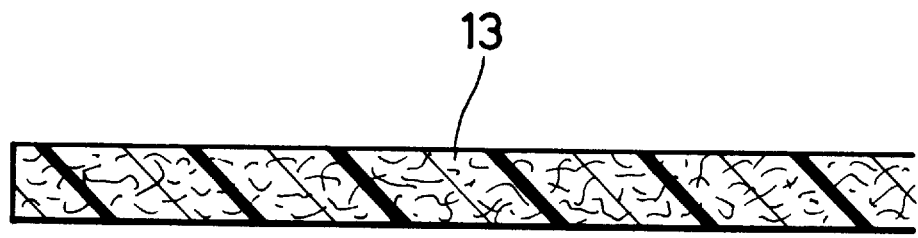
FIG. 9 is a sectional view of an essential portion of a sheet for a composite core.

(ii) The resulting dispersed mixture is formed into a sheet 13 having a predetermined thickness by a paper making machine, as shown in FIG. 9.

Figure 10:
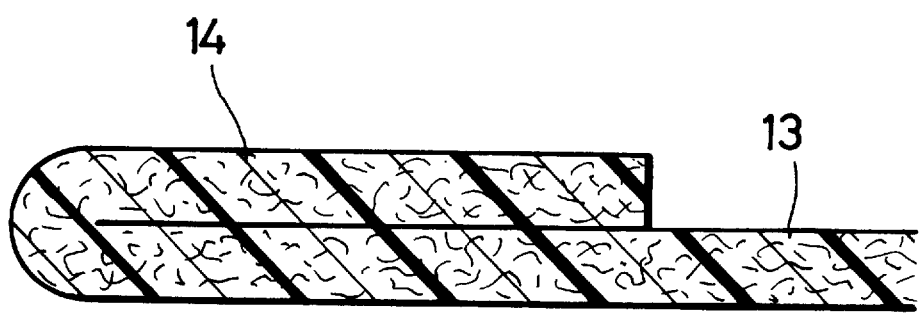
FIG. 10 is a sectional view of an essential portion, illustrating the sheet with a portion thereof folded back.

(iii) As shown in FIG. 10, a portion 14 corresponding to the second region $A_2$ is formed into a double structure by folding back the sheet 13 (or by cutting a portion of the sheet 13 and superposing it on the sheet 13).

(iv) The sheet 13 is pressed under heating while being passed between a pair of endless belts, namely, is subjected to a compression molding, thereby producing a composite core 2 having a uniform thickness over the entire core and including first and second regions $A_1$ and $A_2$.

Alternatively, a composite core with a grammage uniform over the entire core may be produced through steps similar to those described above (but excluding the folding-back step), and a cut piece made from the composite core may be superposed on the composite core to form a second region $A_2$.

In the production of the roof panel 1, specific conditions for the steps (a) to (d) are as follows:

Step (a): the reinforcing fiber in the composite core 2 is a glass fiber (chopped fiber) having a diameter of 10 to 13 μm and a length of 10 to 20 mm; the thermoplastic synthetic resin is a polypropylene; the grammage of the first region $A_1$ is 600 g/m$^2$; the grammage of the second region $A_2$ is 1,200 g/m$^2$; and the thickness $t_1$ is 1 mm.

Step (b): the temperature for heating the composite core 2 by a far infrared radiation heater is in a range of 210° to 215° C.; the thickness $t_3$ of the first region A1 caused by the expansion is 2 mm; and the thickness $t_2$ of the second region $A_2$ caused by the expansion is 4 mm.

Step (c): A material used for the surface skin material layer 6 in the skin material 3 is TPO (a thermoplastic olefin); the thickness of the surface skin material layer 6 is 0.5 mm; a material used for the cushion layer 7 is a polyethylene foam; and the thickness of the cushion layer 7 is 3 mm.

Step (d): the compressed thickness $t_4$ of the second region $A_2$ is 2 mm.

The surface skin material layer 6 in the skin material 3 may be formed of a fabric such as a knitted fabric including a tricot, a woven fabric and the like, and the cushion layer 7 may be formed of a urethane foam or the like.

In addition to the roof panel 1, the laminate may be an interior panel for a vehicle such as a rear shelf, a door panel and the like. In such a case, the roof panel main portion 5 corresponds to an interior panel main portion, and the roof panel outer peripheral portion 4 corresponds to an interior panel outer peripheral panel.

What is claimed is:

1. A process for producing a laminate, comprised of a composite core and a skin material bonded to the core, comprising the steps:

providing a composite core which is formed from a reinforcing fiber and a thermoplastic synthetic resin by a compression molding and which includes a first region and a second region, a content of the reinforcing fiber and the thermoplastic synthetic resin in the first region being adjusted to reduce a grammage (g/m$^2$) thereof relative to the second region, and a content of the reinforcing fiber and the thermoplastic synthetic resin in the second region being adjusted to enhance a rigidity thereof relative to the first region, wherein the composite core has an overall thickness, t1 heating said composite core to expand the composite core and to plasticize said thermoplastic synthetic resin such that the thickness in the second region, t2, is greater than t1;

superposing a skin material onto said composite core; and compressing said composite core and bonding said skin material to said composite core such that the final thickness of the second region t3, is between t1 and t2.

2. A process for producing a laminate according to claim 1, wherein a grammage $M_1$ of said first region is in a range of 400 g/m$^2 \leq M_1 \leq$ 700 g/m$^2$, and a grammage $M_2$ of said second region is in a range of 900 g/m$^2 \leq M_1 \leq$ 1,200 g/m$^2$.

3. A process for producing a laminate according to claim 1 or 2, wherein at least a bonded surface of the skin material is formed of a thermoplastic synthetic resin which is plasticized by said composite core in a heated state.

4. A process for producing a laminate according to claim 1 or 2, wherein the skin material used is a skin material whose surface to be bonded is fluffy.

5. A process for producing a laminate according to claim 1 or 2, wherein said laminate is an interior panel for a vehicle, and wherein said first region is disposed in an interior panel main portion excluding an interior panel outer peripheral portion, and said second region is disposed in said interior panel outer peripheral portion.

6. A process for producing a laminate according to claim 1 or 2, wherein said laminate is a roof panel for a vehicle having a sun roof opening, and wherein said first region is disposed in a roof panel main portion excluding a peripheral portion around said sun roof opening and a roof panel outer peripheral portion, and said second region is disposed in said peripheral portion around said sun roof opening and said roof panel outer peripheral portion.

7. A process for producing a laminate according to claim 1, wherein the contents of the reinforcing fiber and the thermoplastic synthetic resin in said first and second regions are determined relative to each other such that when said composite core is expanded by the heating step, the second region has an expanded thickness ($t_2$) larger than an expanded thickness ($t_3$) of the first region.

8. A process for producing a laminate according to claim 7, wherein said second region is formed to have a larger thickness than that of the first region prior to the heating step by superposing a plurality of portions of the composite core one on another.

* * * * *